Jan. 19, 1932.　　W. A. EDWARDS　　1,842,156
DIRECT FUEL SYSTEM
Filed May 12, 1930　　3 Sheets-Sheet 1
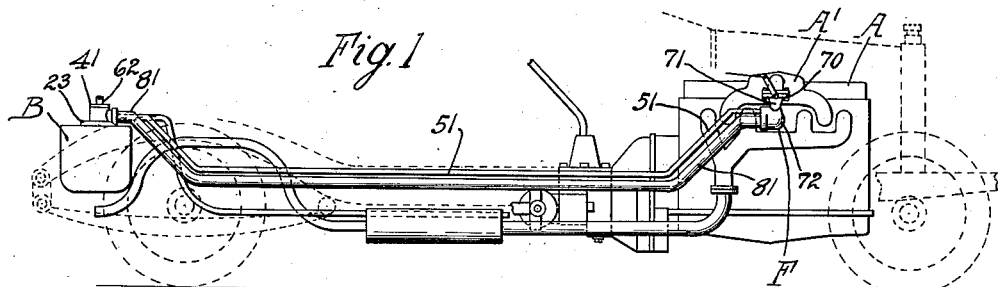
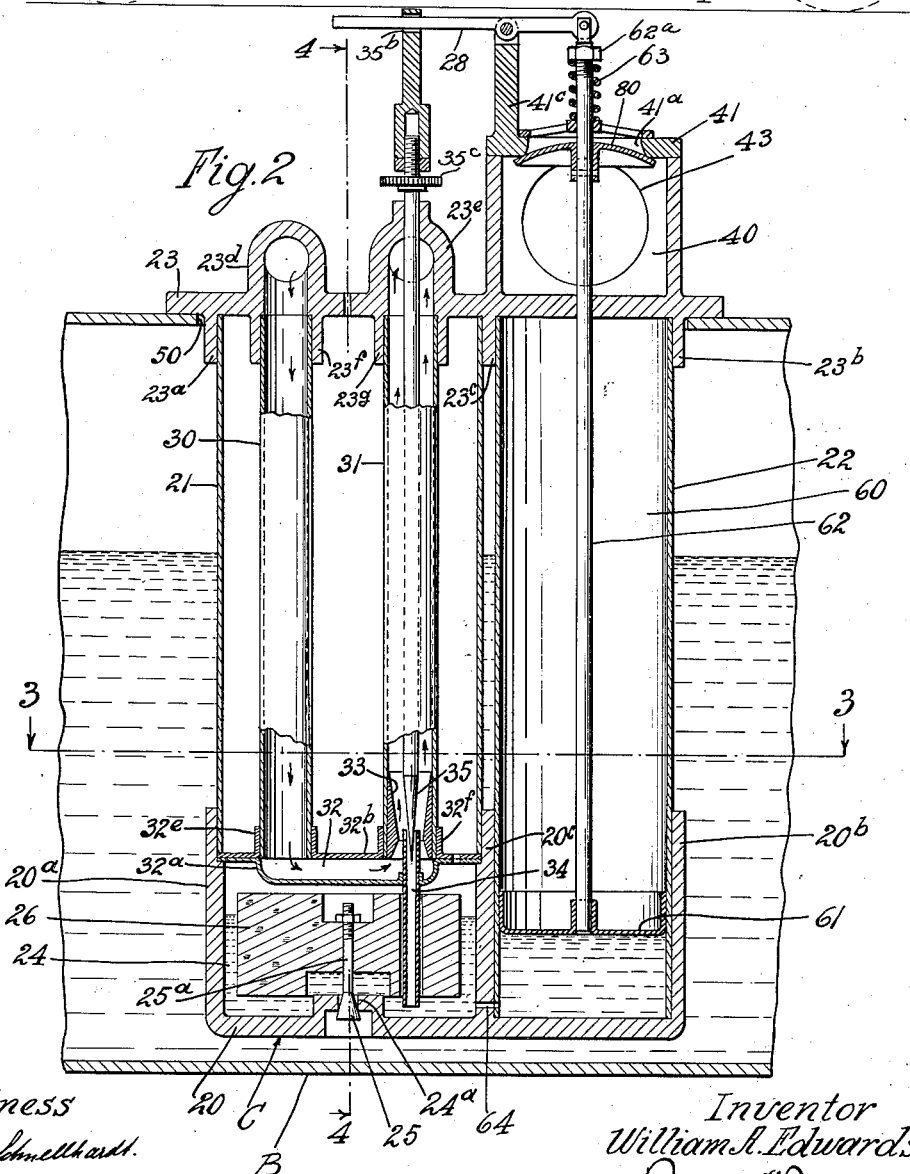
Witness
Wm L. Schmellhardt.
Inventor
William A. Edwards
by Burton & Burton
Attorneys.

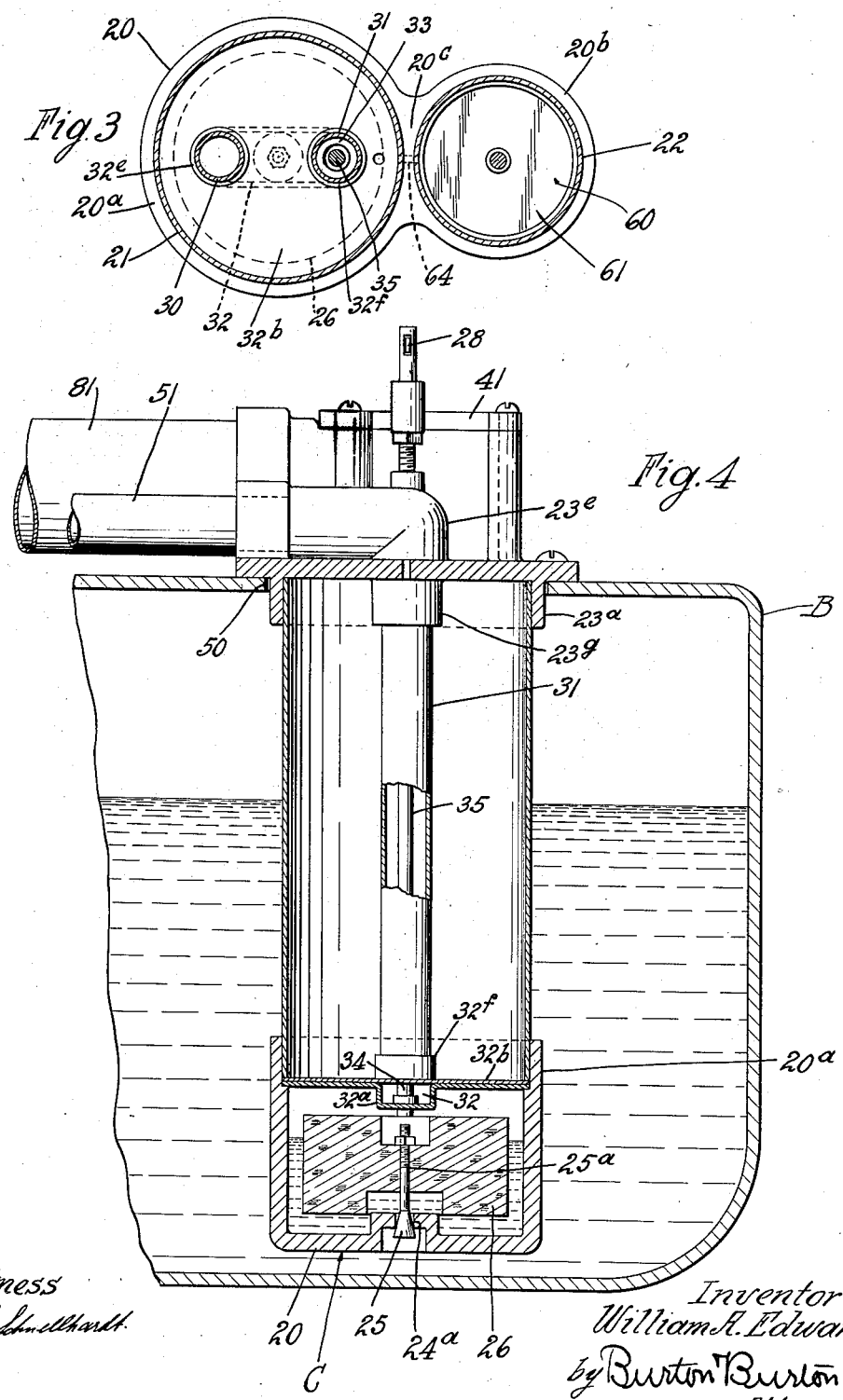

Jan. 19, 1932.                W. A. EDWARDS                1,842,156
                            DIRECT FUEL SYSTEM
                            Filed May 12, 1930          3 Sheets-Sheet 3
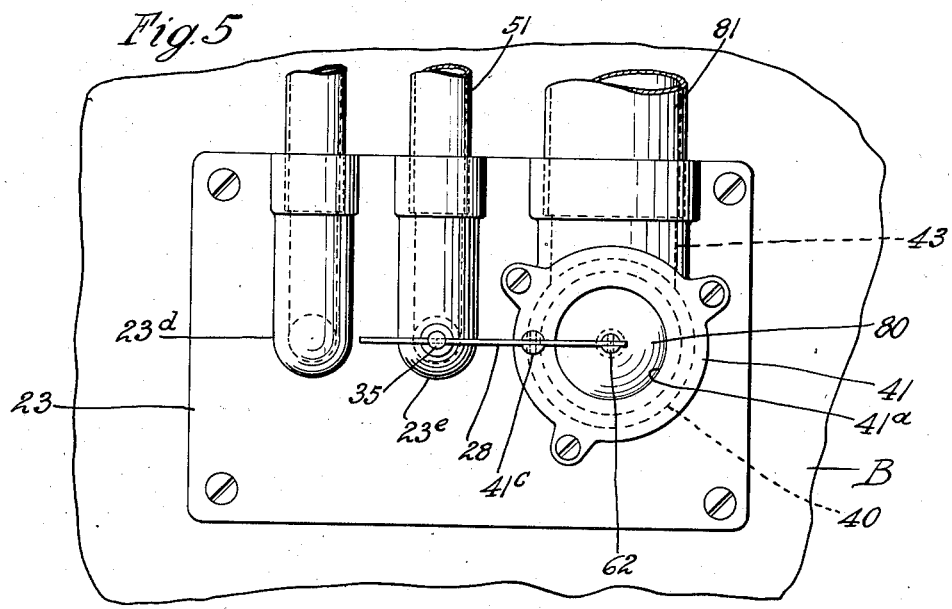
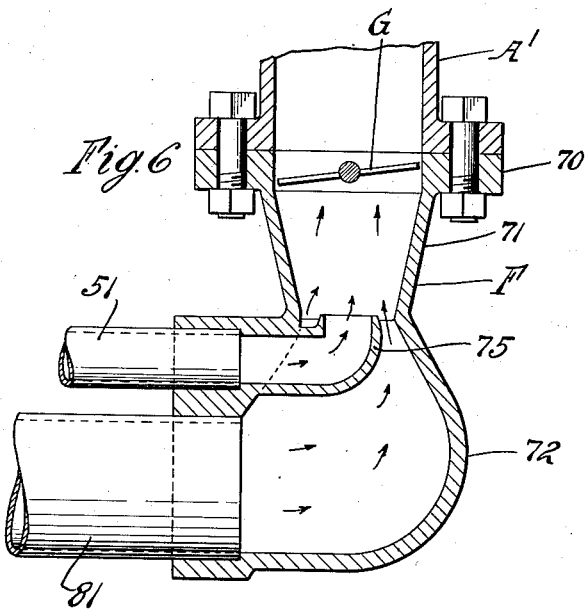

Patented Jan. 19, 1932

1,842,156

UNITED STATES PATENT OFFICE

WILLIAM A. EDWARDS, OF CHICAGO, ILLINOIS, ASSIGNOR TO STEWART-WARNER CORPORATION, OF CHICAGO, ILLINOIS, A CORPORATION OF VIRGINIA

DIRECT FUEL SYSTEM

Application filed May 12, 1930. Serial No. 451,703.

The purpose of this invention is to provide an improved construction for supplying fuel to an internal combustion engine on a motor vehicle adapted to afford such supply to the engine from a main fuel source which may be situated remotely from the engine, and at a lower level than the engine carbureter by the engine suction, taking the fuel directly from said main source. It consists in the elements and featuers of construction shown and described as indicated in the claims.

In the drawings:

Figure 1 is a diagrammatic view for showing the relative location on the vehicle of the several parts co-operating for the purposes of the invention.

Figure 2 is a vertical section longitudinally of the main fuel container axially with respect to sundry pipes and passages therein constituting the level governing chamber and primary mixture forming structure.

Figure 3 is a horizontal section at the line 3—3 on Figure 2.

Figure 4 is a vertical section at the line 4—4 on Figure 2.

Figure 5 is a top plan view of the structure shown in Figure 2.

Figure 6 is a vertical section axial with respect to the main air pipe and the fuel mixture intake passage of the engine.

In the structure shown in the drawings, the engine body is indicated at A, with the intake manifold seen at A¹; the main fuel container is indicated at B. C indicates in totality a casing which is introduced into the container, B, through an opening, 50, formed for that purpose in the upper side of the container, said casing being arranged to comprise and carry a governed level fuel chamber with its inlet-controlling valve and valve-controlled float constituting the familiar construction of a carbureter float chamber, and a primary air pipe with one limb into which the fuel is discharged from the governed level chamber rendering said limb a primary fuel mixture conduit. Said casing, C, comprises also a dash pot chamber extending the entire height of the casing; and the cap plate of the casing has at its upper side an air chamber directly above the dash pot, and which constitutes the intake member of the main air pipe leading to the engine intake, and has the valve controlling the air inlet to said air pipe positioned for operative connection with the plunger of the dash pot for purposes hereinafter described.

The several parts of the structure thus far described in general terms, will now be described in detail.

The casing, C, comprises a cast bottom member, 20, and a cap plate, 23, and sheet metal tubular members, 21 and 22, connecting the bottom plate and the cap, said bottom plate having upwardly projecting webs, 20ª and 20ᵇ, merging in each other at 20ᶜ, for defining the horizontal contour of said tubular connections, 21 and 22, respectively, and the cap plate having corresponding flanges, 23ª and 23ᵇ, merging together in their intermediate portions, 23ᶜ, for similarly fitting the upper ends of the tubular members, 21 and 22. The bottom portion of the chamber defined by the flanges, 20ª and 20ᶜ, of the base, and corresponding flanges, 23ª and 23ᶜ, of the cap member, and enclosed by these flanges and the connecting sheet metal tubular member, 21, constitutes a governed level chamber, 24, having an inlet, 24ª, at the bottom for admitting fuel from the container to said governed level chamber, said port, 24ª, being controlled by an upwardly seating valve, 25, having its stem, 25ª, connected to a float, 26, in the governed level chamber, the construction being the familiar construction of a carbureter float chamber for governing the level of the fuel to be taken by engine suction for discharge into an air passage to form a fuel mixture. The cap plate, 23, has at its upper side two similar bosses, 23ᵈ and 23ᵉ, having extensions, 23ᶠ and 23ᵍ, at the under sides, said bosses being apertured throughout to constitute passages from outside the casing and container to the inside thereof.

A primary air pipe is provided connecting the cavities of said two bosses within the chamber defined by the tubular member, 21, said pipe comprising a limb, 30, leading from the inner terminal, 23ᶠ, of the boss, 23ᵈ downwardly to a point slightly above the governed level of the level governing chamber, 24, and an upwardly extending limb, 31, connected with the lower end of the downwardly extending limb, 30, by a horizontal duct portion, 32, said pipe member, 31, being connected at its upper end to the inwardly extending terminl, 23ᵍ, of the boss, 23ᵉ. The horizontal connecting portion, 32, is shown as formed by two mated sheet metal stampings, 32ᵃ and 32ᵇ, which together form a bridge across the chamber above the portion which contains the float, 26, and which thereby constitutes the governed level chamber, as described, the stamping, 32ᵃ, having the depression which constitutes the connecting passage between the pipe members, 30 and 31, and the stamping, 32ᵇ, having the upstruck flanges, 32ᵉ and 32ᶠ, which afford connection for the lower ends of the pipe members, 30 and 31. In the lower end of the pipe member, 31, there is mounted a Venturi sleeve, 33; and a vertically extending duct, 34, having its intake at the lower part of the governed level chamber, and extending thence upward through the float, 26, which may be of cork, and is apertured for the purpose, is extended fluid-tight through the lower side of the passage, 32, axially with respect to the pipe member, 31, and the Venturi sleeve, 33, in which latter, proximate to the constriction thereof, said duct terminates for fuel discharge into the upwardly extending pipe limb, 31, which thereby becomes a fuel mixture passage. The discharge of the duct, 34, is controlled by a needle valve, 35, having its stem extending up through the pipe member, 31, and emerging through the boss, 23ᵉ, for connection hereinafter described by which the valve is operated. A pipe, 51, connected with the discharge end of the boss, 23ᵉ, extends forwardly toward the engine for connection, hereinafter described, with the engine intake, said pipe constituting a continuation of the primary fuel mixture passage of which the pipe member, 31, is the initial part.

The tubular member, 22, connected at its lower end with the flanges, 20ᵇ and 20ᶜ, of the base, and at its upper end with the flanges, 23ᵇ and 23ᶜ, of the cap plate, constitutes a dash pot chamber in whose chamber, 60, there is mounted and fitted piston-wise at the lower part, a dash pot plunger, 61, having its stem, 62, extending up through the chamber, 60, and emerging through the cap plate extending up also through the air chamber, 40, formed at the upper side of the cap plate having in its cover plate, 41, the air inlet, 41ᵃ, which is controlled by the main air valve, 80, carried by the dash pot plunger, stem, 62, seating upwardly at the inner side of the port, 41ᵃ, a spring, 63, being provided reacting between a spider, 41ˣ, lodged above the cover plate, 41, and the stem, 62, for holding the valve, 80, normally seated. The dash pot chamber, 60, has a restricted communication, as shown at 64, with the governed level chamber at the lower part of the latter substantially at the level of the intake of the fuel duct, 34. A lever, 28, fulcrumed on an upstanding rib, 41ᶜ, on the cover plate 41, constitutes a connection between the stem of the needle valve, 35, and the plunger and air valve stem, 62, for opening the two valves concurrently and proportionately.

The said connection is effected by terminal, 35ᵃ, screwed onto the upper end of the stem of the valve, 35, and having a slot, 35ᵇ, at which it is connected with the lever, 28. The valve stem is furnished with a knurled nut, 35ᶜ, screwed onto the threaded end of the stem of the valve, 35, to the limit of the thread and then pinned fast to said valve stem in order to serve for rotating the valve stem to screw it into the terminal, 35ᵃ, to the proper distance for adjusting the valve, 35, with respect to its seat in the discharge nozzle, 34, to ensure a predetermined opening of said valve at the seated position of the atmosphere valve, 80.

The fuel mixture intake fitting for connection with the intake manifold, is seen at F having its upper end provided with a flange, 70, for securement to the intake manifold and having mounted therein a throttle valve, G, said fitting comprising a venturi, 71, immediately below the flange, 70, and an elbow portion, 72, which affords the inlead to the venturi having its horizontal limb arranged for connection of the main air supply pipe, 81, which extends from said fuel mixture intake fitting rearwardly to and is connected at a lateral opening, 43, of the air chamber, 40. The fuel mixture intake fitting is formed with a hollow boss, 75, extending in from the horizontal limb of the elbow and upturned at the central portion of the Venturi constriction, said boss being hollow to constitute the discharge end of the primary fuel mixture passage, which further comprises the pipe, 51, leading, as described, from the boss, 23ᵉ, and constituting a continuation of the passage of which the initial part is afforded by the up limb, 31, from the venturi, 33, in the chamber, 21, of the casing, C, which is intruded into the fuel container, B.

The operation of this direct fuel feed system will now be described: Starting with the container supplied with liquid fuel, the operation of the engine by the starter developing suction tending to produce a strong air current through the main air pipe, 81, causes the main air valve, 80, to open; and at the same time operates to produce an air current through the pipe, 51 and the connected system which comprises the pipe lines, 31 and 32; and the first mentioned air movement through the main air pipe, 81, operating to open the main air valve, 80, serving by means of the lever, 28, to open the needle valve, 35, the air flow through the primary air pipe and venturi, 33, therein, causes fuel discharge from the fuel duct, 34, into the up limb, 31, of said primary air pipe, rendering said up-limb a primary fuel mixture passage; and the primary fuel mixture thus drawn in is discharged in the main air pipe at the venturi, 71, which has operated by acceleration of the air flow from the primary air pipe to produce depression at the discharge of said primary mixture passage for increasing the rate of flow of the primary mixture, and upon the arrival of said primary mixture at said venturi, operates also for the thorough atomizing of the primary mixture and its uniform admixture with the additional air entering from the main air pipe, to render the final leaned mixture delivered to the engine suitably uniform in quality for uniform operation of the engine.

Upon increase of throttle opening, increasing the air flow and depression or suction tending to increase the opening of the main air valve, 80, it will be observed that the opening movement of that valve will actuate the dash pot plunger, which, reacting to slow down the opening movement of the air valve, will operate at the same time as a force plunger to force fuel from the dash pot chamber through the restricted port, 64, into the governed level fuel chamber; and this action, which is primarily the movement by which the dash pot is adapted to function as described for slowing down the air valve opening movement, serves at the same time to supply to the fuel chamber the fuel which the same engine suction which operates the air valve tends to draw from the fuel chamber, and which withdrawal is permitted by the opening of the needle valve, 35, caused also by the same engine suction through the lever connection between the valves, 80 and 35.

I claim:

1. A fuel feeding system for an internal combustion engine on a motor vehicle having in combination with a main fuel source remote from the engine a governed level fuel chamber located for deriving fuel supply by gravity from the fuel source, a main air pipe having its air intake proximate to the fuel source and extended for connection with the intake of the engine, a fuel conducting passage leading from the governed level fuel chamber for ultimate discharge of the fuel in the main air pipe proximate to its connection with the engine intake, a valve controlling the intake to said air pipe, a dash pot having its plunger connected with said air valve for slowing the opening movement of said valve, and operating connections between said air valve and said fuel controlling valve.

2. In the construction defined in claim 1, a container constituting the fuel source, a casing intruded into said container from the top thereof, the governed level fuel chamber; an air pipe member into which the fuel duct discharges, the dash pot chamber, and the member of the air pipe in which the air valve is mounted and seated being all mounted in and on said casing.

3. The construction defined in claim 1 comprising a main fuel container constituting the fuel source, the governed level fuel chamber being located within said container and the fuel conducting passage comprising a conduit leading from the atmosphere extending down within the container into proximity with the governed level chamber and with a limb extending thence upwardly and emerging at the top of the container, said upwardly extending limb forming a part of the fuel conducting passage from the governed level chamber, the initial part of said passage leading from said chamber and discharging in said upwardly extending limb, the main air supply pipe having its main air inlet proximate to the container, the dash pot being also proximate to the container for enabling the connection of its plunger with the air valve.

4. A construction for the purpose indicated comprising in combination with a low level fuel container, a casing arranged to be intruded downwardly into the container through an aperture in the top of the latter and having a cap plate by which it is stopped on the top wall of the container, a conduit comprising up and down extending limbs united at their lower ends and at their upper ends leading out through the cap plate, one for atmosphere intake and the other for primary fuel mixture and pipe connection from the latter to the fuel mixture intake passage of the engine; a fuel duct in the governed level chamber having intake for fuel at the lower part of the chamber and extending upwardly and protruding for fuel discharge into the lower end of the fuel mixture limb of said conduit; a fuel regulating valve for controlling the fuel discharge in the fuel mixture limb of the conduit, said valve having its operating stem extending up the length of the conduit and emerging through the cap plate at the upper end of said limb, the cap plate having at its upper side an air chamber with a main atmosphere inlet port, a main air outlet port, an inwardly opening air valve for the inlet port, a spring for yieldingly resisting the opening of the air valve; a pipe connection from the outlet port arranged for connection with the fuel mixture intake passage of the engine, the casing comprising a dash pot chamber extending from a location adjacent the governed level chamber to the top of the casing and there terminating under the air chamber; a plunger in the dash pot having its operating stem extending through the cap plate into the air chamber and operatively connected to the main air valve for slowing the opening movement of the valve, and operating connections between said air valve and the fuel regulating valve.

5. A construction for the purpose indicated consisting of a main fuel container arranged to be mounted on an internal-combustion-engine-operated vehicle, remotely from the engine; a governed level fuel chamber with its valve-controlled fuel inlet and float-controlled valve, located in the container at the lower part thereof, an air chamber outside the container at the upper part thereof, an air pipe leading from the air chamber to the fuel mixture intake passage of the engine, a conduit connected for atmospheric air inflow extending into proximity with the governed level fuel chamber and continued thence as a fuel mixture conduit extending to the top of the container and thence outside the container to the fuel mixture intake passage of the engine and there discharging within the main air pipe, a fuel duct in the governed level fuel chamber, having fuel intake at the lower part of the chamber and extending for discharge in said fuel mixture conduit; a valve controlling the fuel discharge from the governed level chamber, and a spring seated valve controlling the air inlet to the air chamber, and lever connections between said valves arranged to cause them to open proportionately.

6. In an apparatus for the purpose indicated in combination with an internal combustion engine having a fuel mixture intake passage, a container constituting a low level fuel source, a chamber submerged in said container having atmospheric communication at its upper part and having its fuel inlet from the container at its lower part, a valve controlling said fuel inlet; a float in the chamber operatively connected with the valve for holding it open against the head of the liquid content of the container by the weight of the float and connections when the float is not upheld by the liquid in the chamber, a conduit leading from the atmosphere downwardly within the container into the chamber and thence without communication with said chamber leading upwardly therefrom and terminating for discharge in the fuel mixture intake passage; a fuel duct leading from the lower part of said chamber upwardly through the wall of said conduit at a point within said chamber for discharge in said conduit for mixture of the fuel so conducted and discharged with the air drawn in by engine suction through said conduit, the latter extending for discharge of said fuel mixture in the fuel mixture intake passage of the engine, said passage being open for air supply antecedent to the point of discharge therein of the fuel mixture conduit.

7. In an apparatus for the purpose indicated, in combination with an internal combustion engine having a fuel mixture intake passage and a throttle valve therein, said passage being open for main air supply anteriorly with respect to the throttle; means for delivering an initial rich fuel mixture into said intake passage for producing a relatively lean mixture for the engine, said means consisting of a fuel container located at a lower level than the intake entrance; an initial fuel-mixture-forming device comprising a chamber positioned in the lower part of the container open to atmospheric pressure at the upper part having fuel inlet at the lower part in the container; and a valve for controlling inflow from the container; a float in the chamber operatively connected with the valve for holding the same seated at a predetermined position of the float at which it may be buoyed by the liquid entering the chamber past the valve; an air and fuel mixture conduit extending in the container proximate to the top of said chamber and thence upwardly out of the container and enters into the fuel mixture intake passage of the engine; a fuel duct extending in the chamber having its intake at the lower part thereof and protruding liquid-tight through the wall of the chamber and into said conduit for discharge of fuel from the chamber into the conduit, the conduit having at the point at which said intake protrudes into it a flow-accelerating restriction whereby the air flow through the pipe tends to cause lowering of pressure at the point of delivery of the duct, the fuel mixture intake of the engine having also a flow-accelerating restriction at the point at which said conduit discharges thereinto.

8. In the construction defined in claim 7, a conduit extended from the engine fuel mixture intake passage to a point at the top of the fuel container, a chamber mounted on the top of said container with which said conduit makes connection, said chamber having an air entrance and an inwardly open valve controlling it, the valve having a stem extending down into the container, a spring for holding the valve normally seated against air entrance, a needle valve extending in the fuel mixture conduit for controlling fuel discharge from the chamber into said conduit, operating connections between said valve and the atmosphere inlet controlling valve, a dash pot chamber extending in the container directly below the chamber last previously mentioned, the atmosphere inlet-controlling valve having its stem extending in said dash pot chamber and a plunger on said stem for dash pot action, said dash pot chamber having communication with the float chamber at the lower part of both said chambers.

In testimony whereof, I have hereunto set my hand at Chicago, Illinois, this 7 day of May, 1930.

WILLIAM A. EDWARDS.